US009096447B2

(12) United States Patent
Felch et al.

(10) Patent No.: US 9,096,447 B2
(45) Date of Patent: Aug. 4, 2015

(54) WATER TREATMENT SYSTEM WITH CARBON REGENERATION CIRCUIT

(71) Applicants: Chad L. Felch, Kronenwetter, WI (US); Kurt M. Knuth, Wausau, WI (US); Robert J. Wenta, Wisconsin Rapids, WI (US); Thomas E. Schulz, Waukesha, WI (US); Bryan J. Kumfer, Ringle, WI (US)

(72) Inventors: Chad L. Felch, Kronenwetter, WI (US); Kurt M. Knuth, Wausau, WI (US); Robert J. Wenta, Wisconsin Rapids, WI (US); Thomas E. Schulz, Waukesha, WI (US); Bryan J. Kumfer, Ringle, WI (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/011,856

(22) Filed: Aug. 28, 2013

(65) Prior Publication Data

US 2014/0061134 A1 Mar. 6, 2014

Related U.S. Application Data

(60) Provisional application No. 61/694,387, filed on Aug. 29, 2012.

(51) Int. Cl.
| | |
|---|---|
| *C02F 1/28* | (2006.01) |
| *C02F 1/72* | (2006.01) |
| *C02F 1/74* | (2006.01) |
| *C02F 3/12* | (2006.01) |
| *C02F 11/08* | (2006.01) |

(Continued)

(52) U.S. Cl.
CPC ............... *C02F 1/281* (2013.01); *C02F 1/283* (2013.01); *C02F 1/727* (2013.01); *C02F 1/74* (2013.01); *C02F 3/1226* (2013.01); *C02F 3/1263* (2013.01); *C02F 11/08* (2013.01); *C02F 2101/306* (2013.01); *C02F 2101/32* (2013.01); *C02F 2101/345* (2013.01); *C02F 2103/365* (2013.01); *C02F 2201/008* (2013.01); *C02F 2303/16* (2013.01)

(58) Field of Classification Search
USPC .......... 210/761, 241, 615–618, 620–621, 631
See application file for complete search history.

(56) References Cited

U.S. PATENT DOCUMENTS

| | | | |
|---|---|---|---|
| 3,856,672 A | 12/1974 | Boswinkle et al. | |
| 4,237,002 A * | 12/1980 | Strudgeon et al. | ............ 210/631 |

(Continued)

FOREIGN PATENT DOCUMENTS

| | | |
|---|---|---|
| EP | 0352891 A1 | 1/1990 |
| EP | 1405827 A1 | 7/2004 |
| GB | 1496747 A | 12/1977 |

OTHER PUBLICATIONS

Sufnarski, M.D., (May 1999), The Regeneration of Granular Activated Carbon Using Hydrothermal Technology, Thesis, The University of Texas at Austin.

(Continued)

*Primary Examiner* — Chester Barry

(57) ABSTRACT

A water treatment system (50) utilizing granular activated carbon (GAC) for the removal of organic contaminants in a process water circuit (52), and including a carbon regeneration circuit (54) in fluid communication with the process water circuit. The carbon regeneration circuit may include a dedicated regeneration vessel (16), or the regeneration process may proceed within a GAC/water contactor (58) of the process water circuit. A process is described wherein spent GAC from the water treatment system is regenerated within the system with an oxidation process that minimizes damage to the carbon granules.

20 Claims, 8 Drawing Sheets

(51) Int. Cl.
  C02F 101/30    (2006.01)
  C02F 101/32    (2006.01)
  C02F 101/34    (2006.01)
  C02F 103/36    (2006.01)

(56) References Cited

U.S. PATENT DOCUMENTS

| | | | | |
|---|---|---|---|---|
| 4,770,806 | A * | 9/1988 | Sullivan et al. | 252/182.17 |
| 4,857,198 | A * | 8/1989 | Meidl | 210/603 |
| 5,591,118 | A * | 1/1997 | Bierck | 588/259 |
| 6,695,953 | B1 * | 2/2004 | Locke et al. | 204/157.15 |
| 7,198,722 | B2 | 4/2007 | Hussain | |
| 7,972,512 | B2 * | 7/2011 | Conner | 210/615 |
| 8,329,035 | B2 | 12/2012 | Conner | |
| 8,852,424 | B1 * | 10/2014 | Puhala et al. | 208/39 |
| 2004/0168972 | A1 * | 9/2004 | Hughes et al. | 210/502.1 |
| 2007/0209999 | A1 * | 9/2007 | Smith et al. | 210/631 |
| 2009/0101583 | A1 * | 4/2009 | Perry | 210/664 |

OTHER PUBLICATIONS

Dusenburry, J., Cannon, F., (Jul. 2004) Effect of Advanced Oxidants Generated Via Ultraviolet Light on a Sequentially Loaded and Regenerated Granular Activated Biofilter, Air & Waste Manage. Assoc. 54: pp. 871-889.

Shende, R.V., Mahajani, V., (2002), Wet Oxidative Regeneration of Activated Carbon Loaded with Reactive Dye, Waste Management 22(1):73-83 (Abstract and two figures).

Lenntech, Adsorption / (http://www.lenntech.com/library/adsorption/adsorption.htm)(published Oct. 2009).

Siemens Water Technologies, (2010) PACT and WAR Systems: Cleaner Treated Effluents, Lower Operating Costs.

EPA, National Risk Management REsearch Laboratory (Nov. 2007) In Situ Regeneration of Granular Activated Carbon (GAC) Using Fenton's Reagents (Abstract).

* cited by examiner

WATER TREATMENT SYSTEM WITH CARBON REGENERATION CIRCUIT

CROSS-REFERENCE TO RELATED APPLICATIONS

This application claims benefit of the 29 Aug. 2012 filing date of U.S. Provisional Patent Application No. 61/694,387, which is incorporated by reference herein.

FIELD OF THE INVENTION

The present invention relates generally to water treatment systems, and more specifically to water treatment systems that utilize granular activated carbon (GAC).

BACKGROUND OF THE INVENTION

Adsorption is the process of binding and removing certain substances from a solution through the use of an adsorbent. Activated carbon is a commonly used adsorbent in the treatment of water, municipal wastewater, and organic industrial wastewaters, and it is typically used in powdered or granular form.

U.S. Pat. No. 7,972,512 describes a system that treats industrial waste water that includes oils, such as from refineries, utilizing GAC. The treatment system exposes the wastewater to the GAC in an aeration tank that is upstream of biological membranes. Advantageously, the GAC is held back from gaining entry to the membranes by screens. Upon being exhausted in its capacity to adsorb organic compounds, the GAC becomes "spent." The spent GAC is removed from the aeration tank via a discharge port and fresh GAC material is introduced into the system in its place. The spent GAC may be disposed of, or may be transported offsite to be regenerated (reactivated) by removing the adsorbed organics, typically with a thermal process such as wet air regeneration (WAR) or in a reactivation furnace.

Other water treatment systems are known that utilize activated carbon without biological membranes. Such systems may circulate water to be treated through a GAC column or canister. Spent GAC columns or canisters are removed from the system and is either discarded or transported to a reactivation facility.

Spent GAC is typically regenerated at high temperature in a furnace. It is also known to regenerate GAC using chemical reagents, ozone or wet air oxidation. A concern when regenerating granular material is to limit the degradation of the particle size range caused by the regeneration process.

BRIEF DESCRIPTION OF THE DRAWINGS

The invention is explained in the following description in view of the drawings that show.

DETAILED DESCRIPTION OF THE INVENTION

The present inventors have developed water treatment systems and processes utilizing granular activated carbon (GAC), and including an integrated carbon regeneration circuit. Whereas prior art systems required spent GAC to be removed from the system for disposal or for off-site regeneration, aspects of the present invention envision systems and processes that include a capability to regenerate spent GAC within the water treatment system itself, thereby reducing operational costs. Such systems include a process water circuit and a carbon regeneration circuit in fluid communication with the process water circuit. Moreover, organic-laden water produced by the regeneration circuit during the regeneration process may be further treated in the process water circuit rather than in a separate follow-on reactor as is typical with prior art systems. In some embodiments, the present invention accomplishes all of these functions without any physical relocation of the GAC by utilizing the GAC-containing vessel as both a process water treatment vessel and as a wet air regeneration reactor.

Figure 1:
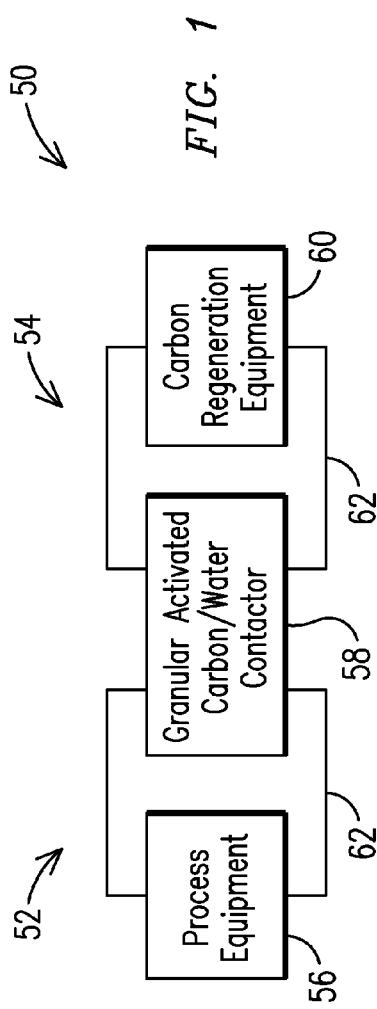
FIG. 1 is a schematic illustration of a water treatment system in accordance with an embodiment of the invention.

FIG. 1 is a schematic illustration of one such water treatment system 50 in accordance with aspects of the invention. The system 50 includes a water circuit 52 and a carbon regeneration circuit 54. The water circuit 52 includes process equipment 56 wherein water is exposed to and becomes polluted by organic contaminants. The process equipment 56 may take any known form, such as an industrial wastewater treatment facility or a municipal water treatment plant, for example. The water circuit 52 includes a GAC/water contactor 58 wherein water that is polluted with the organic contaminants produced by the process equipment 56 is exposed to granular activated carbon. The GAC/water contactor 58 may comprise an open aeration tank or a closed column or canister, for example. The carbon regeneration circuit 54 includes carbon regeneration equipment 60 such as may be used to provide and to process water for a wet air regeneration (WAR) process. The carbon regeneration circuit 54 is in fluid communication with the process water circuit 52, as illustrated by the piping 62 interconnecting at the GAC/water contactor 58. In biological systems where the GAC/water contactor is an open aeration vessel, a low energy pump is used to transfer the spent GAC to a dedicated regeneration vessel in order to minimize erosion of the GAC particles. In a GAC column system, the GAC/water contactor itself may be used for conducting the WAR process, thereby safeguarding the GAC particles and further simplifying the system. The regeneration circuit 54 advantageously supplies highly oxygenated water at subcritical conditions to oxidize the adsorbed components and to solubilize biological solids of the spent GAC at temperatures significantly lower than those used in prior art WAR processes, thereby further preserving the integrity of the GAC particles. In certain embodiments the carbon regeneration circuit 54 circulates oxygen saturated liquid only, thereby eliminating erosion of GAC particles by two phase flow and maximizing the oxidation effect to facilitate regeneration at a reduced temperature compared to prior art systems. Additional embodiments and optional features of the invention are described more fully below with reference made to the other figures.

Figure 2A:
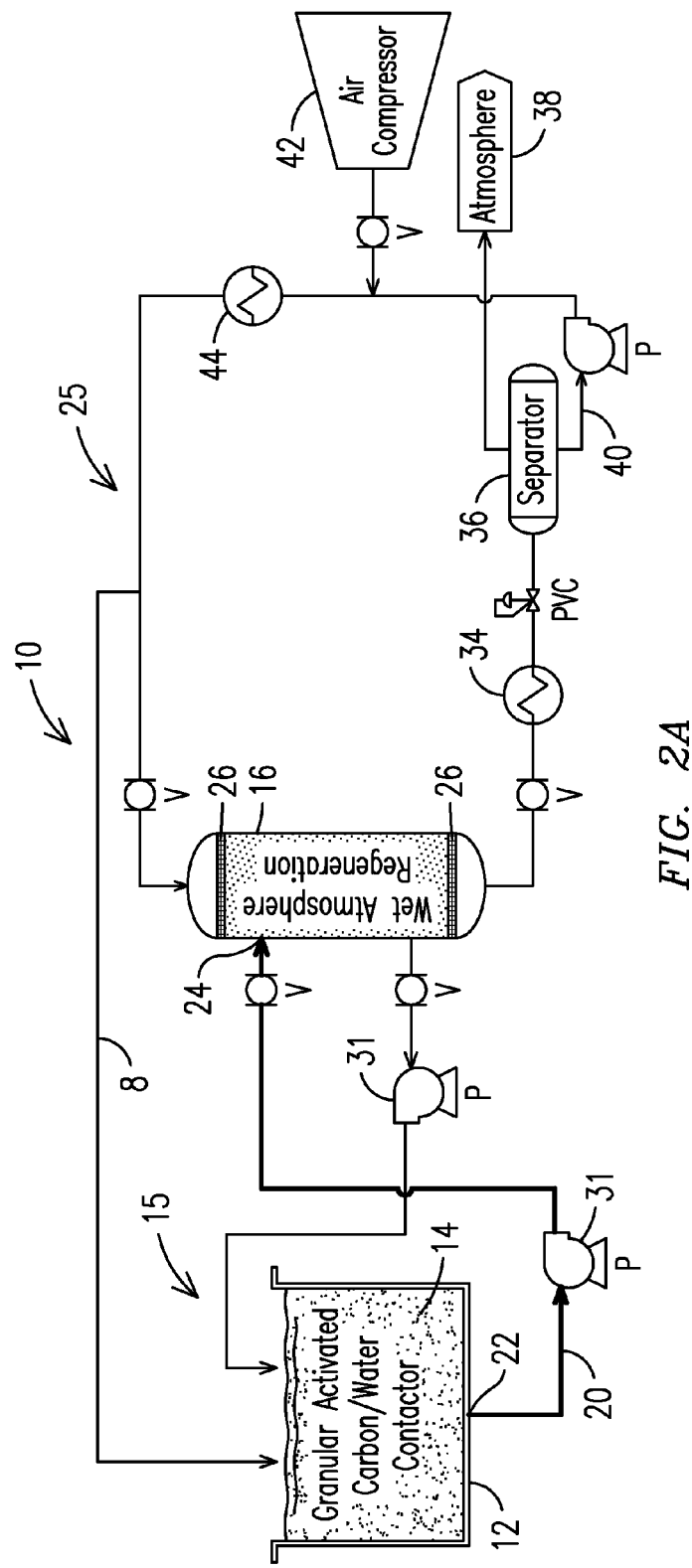
FIGS. 2A-2C are schematic representations of another embodiment of a system for regenerating GAC in accordance with an aspect of the present invention.
Figure 2B:
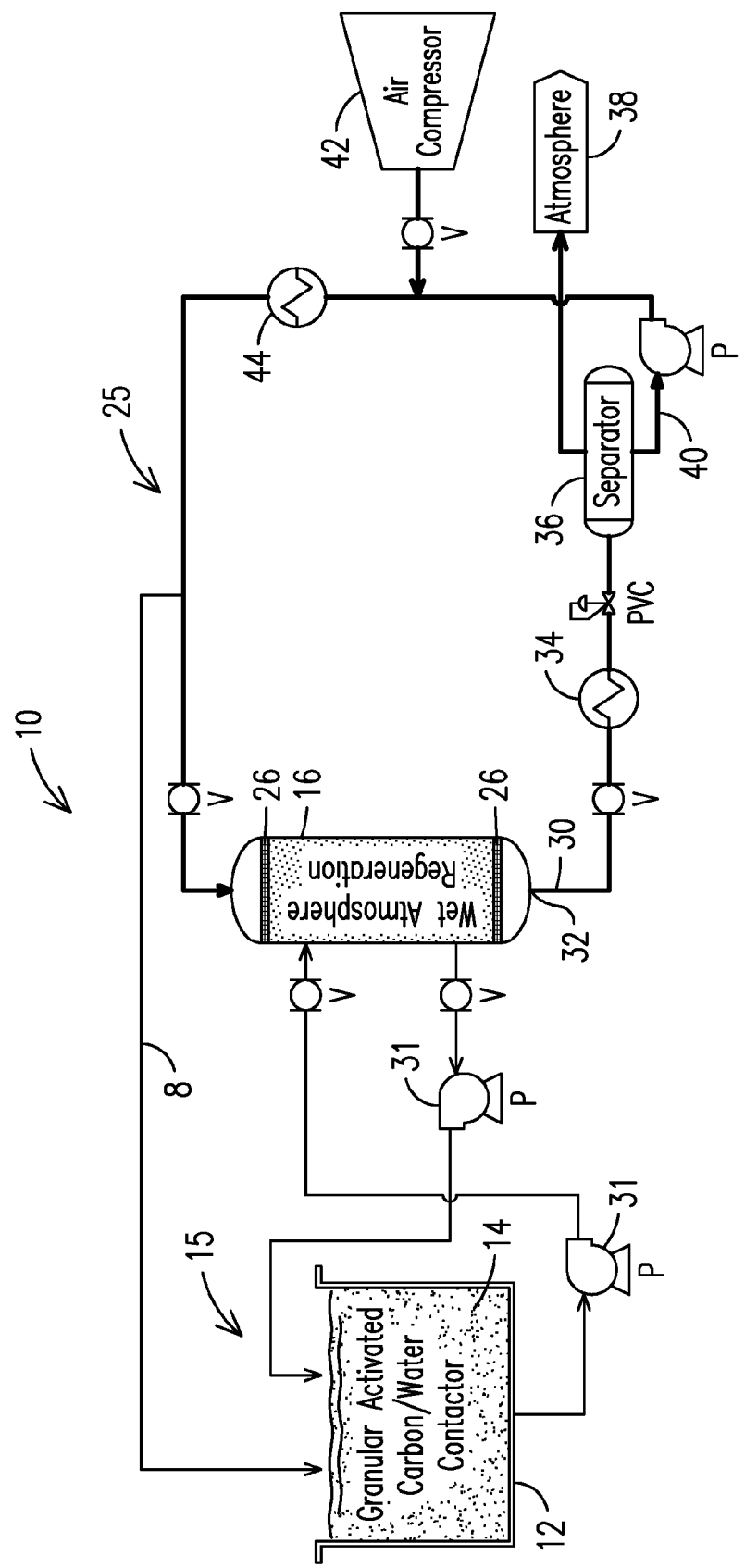
Figure 2C:
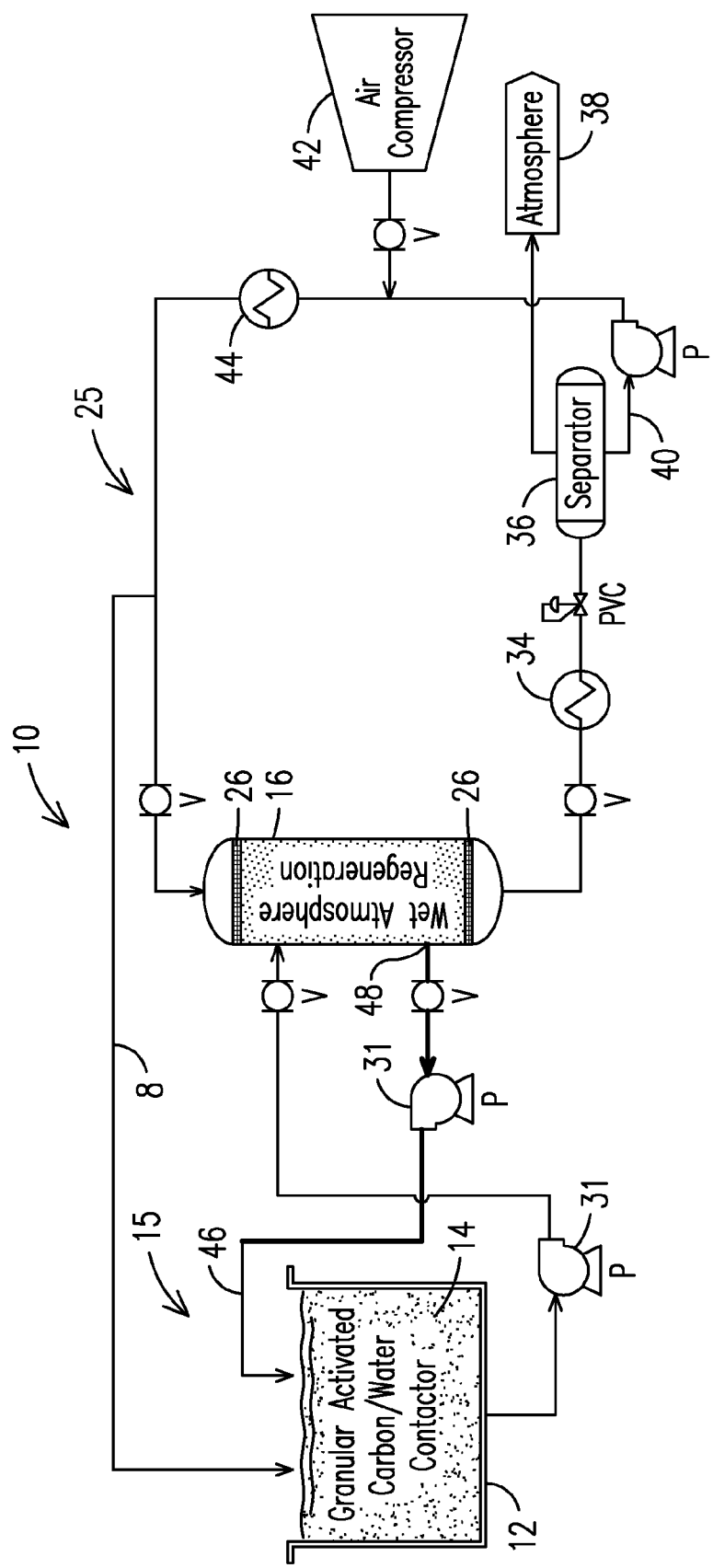

FIGS. 2A-2C illustrate a first embodiment of a wastewater treatment system 10 in accordance with an aspect of the present invention. As shown in FIGS. 2A-2C, the system 10 includes a water circuit 15 comprising a source of organic contaminants and a GAC/water contactor 12. The system 10 further includes a carbon reactivation circuit 25 that is in isolatable fluid communication with the GAC/water contactor 12. By "isolatable," it is meant that the operation of the water circuit 15 can be isolated or otherwise separated from the operation of the carbon regeneration circuit 25. In an embodiment, the operation of the water circuit 15 is isolated from the operation of the carbon regeneration circuit 25 by one or more valves (V) as shown in the figures. In certain embodiments, the carbon regeneration circuit 25 can be removably interfaced with the water circuit 15. For example, equipment defining the carbon regeneration circuit 25 may be transported via a trailer or a skid to a facility having an existing water circuit 15, and the two circuits may be fluidly connected to operate the system as described herein. In this manner, aspects of the invention may be incorporated on a back fit or upgrade basis, as well as in a newly designed plant.

The GAC/water contactor 12 typically comprises a plurality of GAC particles 14 as are known in the art for capturing at least a portion of the organic contaminants. In an embodiment, the GAC/water contactor 12 is a GAC-loaded aeration tank that is a component of a membrane biological reactor (MBR) as is known in the art. Typically, microorganisms are added to the GAC/water contactor 12 in an aeration tank to help break down the organic compounds adsorbed on the GAC. An exemplary aeration tank is described in U.S. Pat. No. 7,972,512, the entirety of which is incorporated by reference herein. In another embodiment, the GAC/water contactor 12 comprises a packed GAC vessel, such as a GAC column, a GAC cartridge, or a GAC biofilter as are known in the art. As is the case with a biofilter, the GAC vessel may contain a plurality of microorganisms for breaking down organic compounds adsorbed on the GAC.

The GAC particles 14 are suitable for removing a quantity of organic compounds from an organic compound-containing stream. In an embodiment, the organic compound-containing stream is an industrial wastewater stream, such as a wastewater stream from a refinery process. Exemplary materials in the stream to be removed in the GAC/water contactor 12 include but are not limited to pesticides, phenols, phthalates, and hydrocarbons, e.g., aromatic hydrocarbons. Once the GAC/water contactor 12 is subjected to the organic compound-containing stream, the ability of at least a portion of the GAC particles 14 to adsorb further carbon-containing compounds will typically become exhausted or "spent." Thus, after exposure to the stream, a quantity of spent GAC 20 will be provided.

The carbon reactivation circuit 25 comprises one or more components sufficient to regenerate an amount of the spent GAC 20. As will be described and shown in detail below, in an embodiment, the carbon reactivation circuit 25 comprises at least one pump, at least one heater, and a source of pressurized oxygen-containing gas interconnected with one another to circulate heated oxygenated water through the spent GAC 20 for wet air regeneration (WAR) of the spent GAC 20.

In the embodiment shown, the carbon reactivation circuit 25 comprises a dedicated regeneration vessel (hereinafter "Wet Air Regeneration 16" or "WAR unit 16") within which wet air regeneration of the spent GAC 20 may take place. As shown in FIG. 2A, once spent GAC 20 is present, the spent GAC 20 may be pumped from an outlet 22 of the GAC/water contactor 12 to the WAR unit 16 for the wet air regeneration of the spent GAC 20 by oxidation and/or by solubilization of organic compound-containing compounds adsorbed on the GAC particles 14. To accomplish this, there is provided one or more carbon transfer pumps 31 connected between the GAC/water contactor 12 and the WAR unit 16 operable to selectively transfer GAC, e.g., spent GAC or regenerated GAC, there between. As shown, the WAR unit 16 comprises an inlet 24 for receiving a quantity of the spent GAC 20. The spent GAC 20 settles within a cavity of the WAR unit 16. In an embodiment, the WAR unit 16 further includes a pair of GAC retention screens 26 for preventing attrition of the GAC particles 14 from the WAR unit 16. The GAC retention screens 26 are particularly useful to prevent damage to downstream membranes when membranes are utilized downstream of the WAR unit 16 as would be the case if the GAC/water contactor 12 is a component of a membrane biological reactor (MBR).

Typically, the spent GAC 20 is in the form of a slurry; however, it is understood that the present invention is not so limited. In an embodiment, the spent GAC 20 is delivered from the GAC/water contactor 12 to the WAR unit 16 in a manner that does not damage the GAC particles 14, such as by providing pump(s) 31 as an air lift pump, a low shear centrifugal pump, or a diaphragm pump (or the like). In this way, there is provided a relatively low pressure transfer of the GAC between the GAC/water contactor 12 and the WAR unit 16.

Once at least some spent GAC 20 is delivered to the WAR unit 16 of the carbon regeneration circuit 25, the spent GAC 20 may undergo a wet air regeneration or reactivation (WAR) process to allow for the subsequent use of the spent GAC 20 in a subsequent water treatment process. The WAR process at least requires an oxygenated liquid stream traveling through the spent GAC 20. Referring to FIG. 2B, the water circuit 15 is isolated and the spent GAC 20 is regenerated within the WAR unit 16 of the carbon regeneration circuit 25 under conditions, e.g., a suitable pressure and temperature, to oxidize and/or dissolve a quantity of adsorbed organic materials off the GAC particles 14. To accomplish the regeneration of the GAC particles 14, the system 10 utilizes an oxygenated liquid traveling through the WAR unit 16. In an embodiment, the oxygenated liquid is entirely or at least partially provided as a liquid. As shown in FIG. 2B, for example, the liquid portion 30 may be purged or otherwise delivered from an outlet 32 of the WAR unit 16. Preferably, most of the GAC particles 14 are retained within the WAR unit 16 by the retention screens 26 and do not travel into the liquid portion 30 from the WAR unit 16. While not shown, optionally, an external liquid source, such as an external water source, may be provided to supplement the volume of the liquid portion 30 for the wet air regeneration process, if necessary or desired.

The flow of the liquid portion 30 from the outlet 32 of the WAR unit 16 may be controlled by one or valves (V) as shown. From the outlet 32, the liquid portion 30 may travel through a cooler 34 to reduce a temperature of the liquid portion 30 before traveling through a gas/liquid separator 36. A pressure control valve (PVC) may be disposed between the cooler 34 and the separator 36. The cooler 34 reduces the temperature of the fluid, and it may be a regenerative cooler associated with heater 44. The separator 36 is in fluid communication with an atmospheric vent 38 to relieve pressure created by the air compressor 42 supplying fresh oxygenated gas. The oxygen primarily aids in oxidizing organic compounds adsorbed onto the GAC particles 14 in the WAR unit 16.

As shown in FIG. 2B, the liquid 40 may be pumped via one or more pumps (P) from the separator 36 to the WAR unit 16. In an embodiment, as shown, the liquid 40 may be oxygenated with air from a suitable oxygen source, such as an air compressor 42. In certain embodiments, to determine the extent of oxygenation required for the liquid 40, the system 10 may include one or more oxygen sensors for sensing an amount of oxygen in the air stream (bleed flow) traveling from the separator 36 to the atmospheric vent 38. The measured oxygen levels may be communicated from the oxygen sensors to a controller in communication with the air compressor 42 to increase/decrease an amount of air/oxygen delivered to the liquid 40 based upon the sensed oxygen levels to decrease, maintain, or increase oxygen levels in the liquid 40 to within a predetermined range or above a predetermined minimum value. In an embodiment, the bleed flow is maintained to at least 3 vol. %, and in another embodiment, from 3-5 vol. % oxygen.

From the separator 36, the oxygenated liquid 40 may further be heated by a heater 44 before being delivered to the WAR unit 16 to aid in the regeneration of spent GAC 20. In addition to the oxygenation and elevated temperature, the regeneration of spent GAC 20 in the WAR unit 16 also takes place under an elevated pressure.

Aspects the present invention provide for the regeneration of GAC under oxygen rich (near or at saturation conditions) subcritical conditions. As such, the processes and systems described herein can operate at lower pressures and temperatures than known systems and processes. The lower temperatures and pressures reduce the likelihood of thermal breakdown and/or structural modification of the GAC, which would reduce its adsorption capacity in subsequent use. In addition, under the oxygen rich subcritical conditions described herein, the spent GAC 20 is likely to be regenerated by oxidation of the adsorbed organic compounds on the spent GAC 20 and/or solubilization of the adsorbed organic compounds/biological solids rather than by desorption of the organic compounds on the spent GAC 20 as is typical in prior art systems and processes. Desorption is less preferred as the desorbed compounds retain their original structures, and thus may reattach to the regenerated GAC in solution. In contrast, the conditions described herein promote at least the oxidation of the desorbed compounds. After oxidation, the desorbed organic compounds are unlikely to become re-adsorbed to the regenerated GAC, thereby resulting in a more effective regeneration process. In an embodiment, the oxygenated liquid 40 has an oxygen content equal to a saturation value for the corresponding temperature and pressure. Further, in an embodiment, the oxygenated liquid 40 may be heated to a temperature of less than 300° C., and in a particular embodiment from 200° C. to 240° C. Still further, the oxygenated liquid may be maintained at a pressure at least sufficient to avoid unwanted flashing, such as between 150 psi and 1,000 psi, or as high as 2,000 psi for temperatures approaching 300° C.

Liquid may be bled from the carbon reactivation circuit 25 to the GAC/water contactor 12. This bleed flow 8 functions to purge dissolved carbon dioxide and organic materials that enter the reactivation circuit 25 as organic material is removed from the GAC during the regeneration process. A make-up water supply (not shown) may be used to maintain water volume in the reactivation circuit 25.

Following exposure of the GAC particles 14 to the oxygenated liquid 40 under pressure and temperature in the WAR unit 16 for an effective duration, the GAC is regenerated. As shown in FIG. 2C, the regenerated GAC 46 may be returned from an outlet 48 of the WAR unit 16 to the GAC/water contactor 12 by one or more pumps, such as pump(s) 31 as described herein, for further treatment of an organic compound-containing stream, such as a wastewater material, in the GAC/water contactor 12.

In certain embodiments, the introduction of spent GAC 20 into the WAR unit 16 may be done on a batch or semi-batch basis, and thus the regeneration of the spent GAC 20 can also be said to be done on a batch or semi-batch basis in such embodiments. On the other hand, in certain embodiments, the oxygenated liquid 40 may be delivered into the WAR unit 16 on a continuous basis. Semi-batch reactors operate much like batch reactors in that they typically take place in a single vessel with similar equipment. However, in contrast to a batch reactor, a semi-batch reactor allows for periodic reactant addition and/or product removal over the process. For example, in this instance, a semi-batch reactor would allow for the partial filling of the spent GAC 20 in the WAR unit 16 with the flexibility of adding more spent GAC 20 as time progresses and/or of removing regenerated GAC 40 from time to time from the WAR unit 16 as time progresses. At the same time, the heated, pressurized oxygenated liquid 40 may be fed to the WAR unit 16 on a continuous basis or through at least two continuous cycles of the liquid 40 through the spent GAC 20. Because the spent GAC 20 is delivered to the WAR unit 16 on a batch or semi-batch basis, the spent GAC 20, which is typically in the form of a slurry, is not required to flow through a pressure control valve. In this way, the likelihood of the pressure-induced reduction of the GAC to a smaller particle sized material, such as a powder, is substantially decreased. Prior art continuous treatment processes deliver the regenerated GAC out of the WAR vessel through a pressure reducing valve which presents a rigorous environment that is damaging to the GAC particles 14.

The spent GAC 20 is fed to the WAR unit 16 in a manner that substantially reduces the likelihood of damage to the GAC particles 14. In an embodiment, the WAR unit 16 may be at least partially depressurized so as to allow for the pressure-reduced transport of the GAC into or out of the WAR unit 16. Thereafter, the pressure is increased as described herein for the regeneration of GAC. In addition to the depressurization, the pumping of the spent GAC 20 to the WAR unit 16 may be done via a low pressure pump, such as by an air lift pump, low shear centrifugal or diaphragm pump, or the like. In certain embodiments, the use of a low pressure pump is combined with depressurization of the WAR unit 16 to substantially prevent the pressure induced reduction of GAC into smaller particles, such as powdered activated carbon (PAC).

In certain embodiments, two or more of the above-described systems (two or more of system 10) may be provided and operated in parallel. Alternatively, two parallel process water circuits 15 and/or two parallel carbon regeneration circuits 25 may be interconnected to provide operational flexibility. In this way, despite the transport of the spent GAC 20 into the WAR unit 16 on a batch or semi-batch basis only, or during repair/maintenance of one system, the treatment of water and/or the regeneration of spent GAC may still be continuous or substantially continuous Now referring to FIGS. 3A-3C, there is shown another embodiment of a water treatment system 100 in accordance with an aspect of the present invention. The system 100 may include some or all of the components described above with respect to system 10 and any descriptions described for system 10 may be applicable to system 100 described herein. The system 100 comprises a water circuit 115 and further comprises a carbon reactivation circuit 125 that is in isolatable fluid communication with the GAC/water contactor 12 of the water circuit 115. In an embodiment, the operation of the water circuit 115 can be isolated from the operation of the carbon regeneration circuit 125 by one or more valves (V) as shown in the figures. In addition, the carbon regeneration circuit 125 may be removably interfaced with the water circuit 115.

Figure 3A:
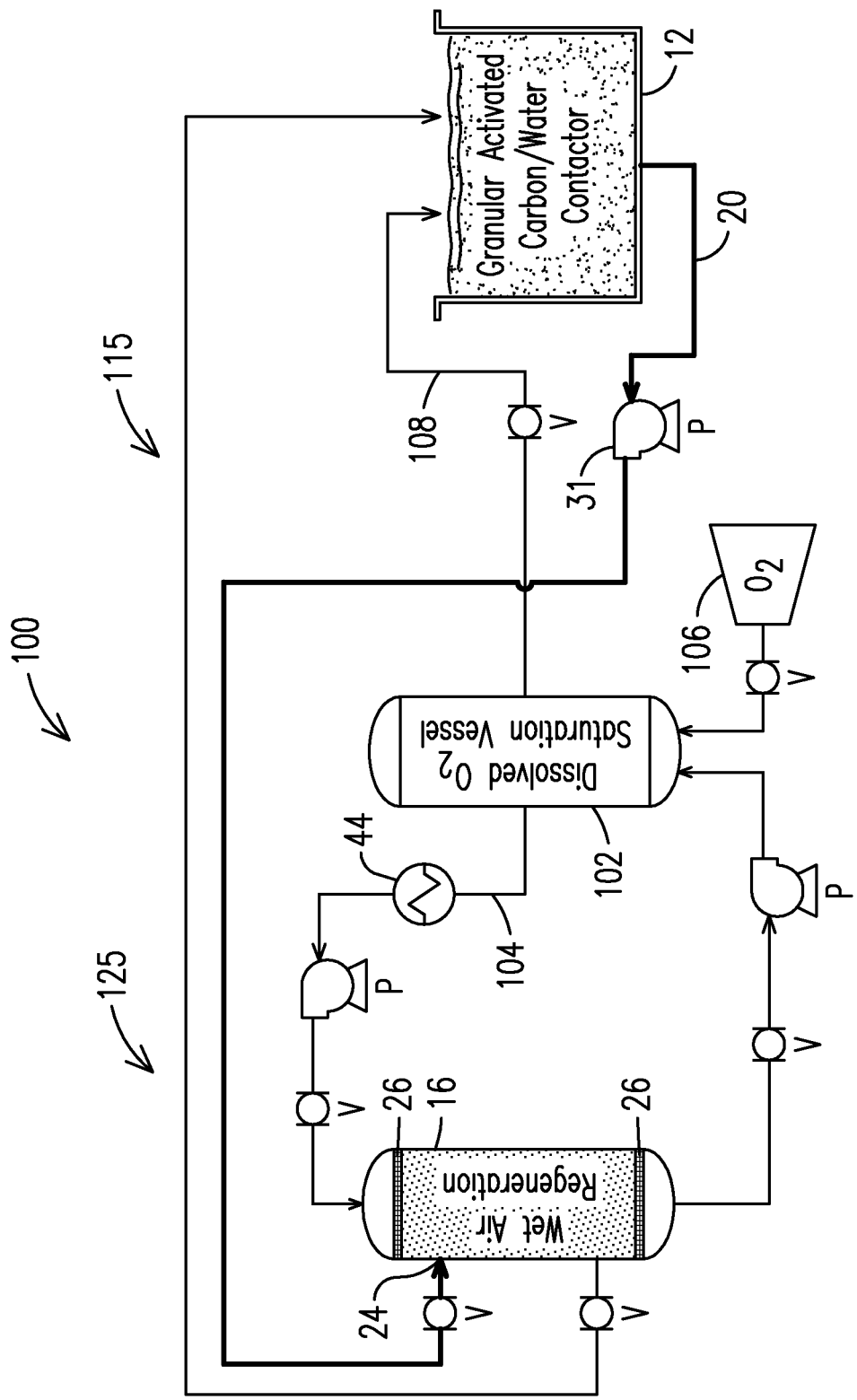
FIGS. 3A-3C are schematic representations of another embodiment of a system for regenerating GAC in accordance with an aspect of the present invention.
Figure 3B:
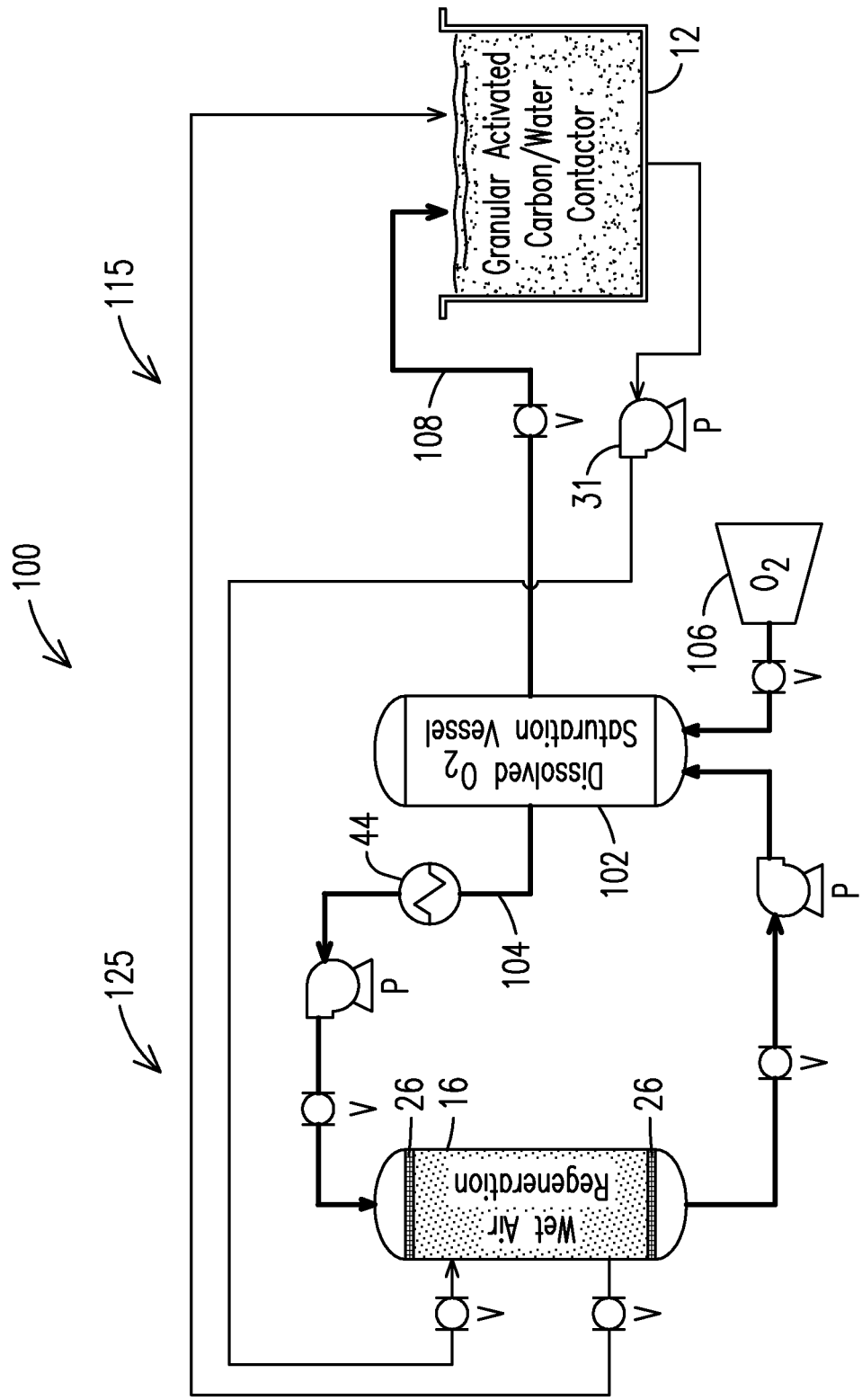

As shown in FIG. 3A, the spent GAC 20 may be delivered from the GAC/water contactor 12 to the WAR unit 16 as was previously described herein by one or more carbon transfer pumps 31. In an embodiment, however, instead of forming/maintaining a two phase oxygenated liquid 40 as described above, the liquid portion 30 exiting from an outlet of the WAR unit 16 is instead delivered to a dissolved $O_2$ saturation vessel 102 where oxygen is dissolved into the liquid portion 30 so as to form and/or maintain an oxygenated liquid 104 as shown in FIG. 3B. In some embodiments, the liquid 104 is fully saturated with oxygen. The single phase oxygenated liquid 104 may provide advantages over a two-phase (air and liquid) oxygenated liquid 40. For instance, the single phase oxygenated liquid 104 may be pumped into the WAR unit 16 at a greater temperature relative to a two phase liquid. In addition, the single phase oxygenated liquid 104 also reduces the likelihood of cavitations in associated pumps.

To accomplish the oxygenation of the liquid portion 104, pressurized oxygen may be continuously or intermittently delivered to the dissolved $O_2$ saturation vessel 102 from an external oxygen source 106. The oxygen content may be any suitable amount for the particular application. Once oxygenated, the oxygenated liquid 104 is directed from the dissolved $O_2$ saturation vessel 102 to the WAR unit 16 via one or more pumps. To heat the oxygenated liquid, a heater 44 may be disposed in fluid connection between the dissolved $O_2$ saturation vessel 102 and the WAR unit 16. In an embodiment, the oxygenated liquid 104 is heated to a temperature of at least about 100° C., and in particular embodiment to at least about 200° C., which is higher than if the oxygenated liquid 104 defined a two phase system. In particular embodiments, the oxygenated liquid 104 may be heated to a temperature of less than 300° C., and in a particular embodiment from 200° C. to 240° C.

Similar to the process described in FIGS. 2A-2C above, the regeneration of GAC takes place under oxygen rich subcritical conditions. As such, the conditions described herein promote at least the oxidation of the desorbed compounds on the spent GAC 20 utilizing the oxygenated liquid 104. After oxidation, the desorbed organic compounds are unlikely to become re-adsorbed to the regenerated GAC, thereby resulting in a more effective regeneration process.

Figure 3C:
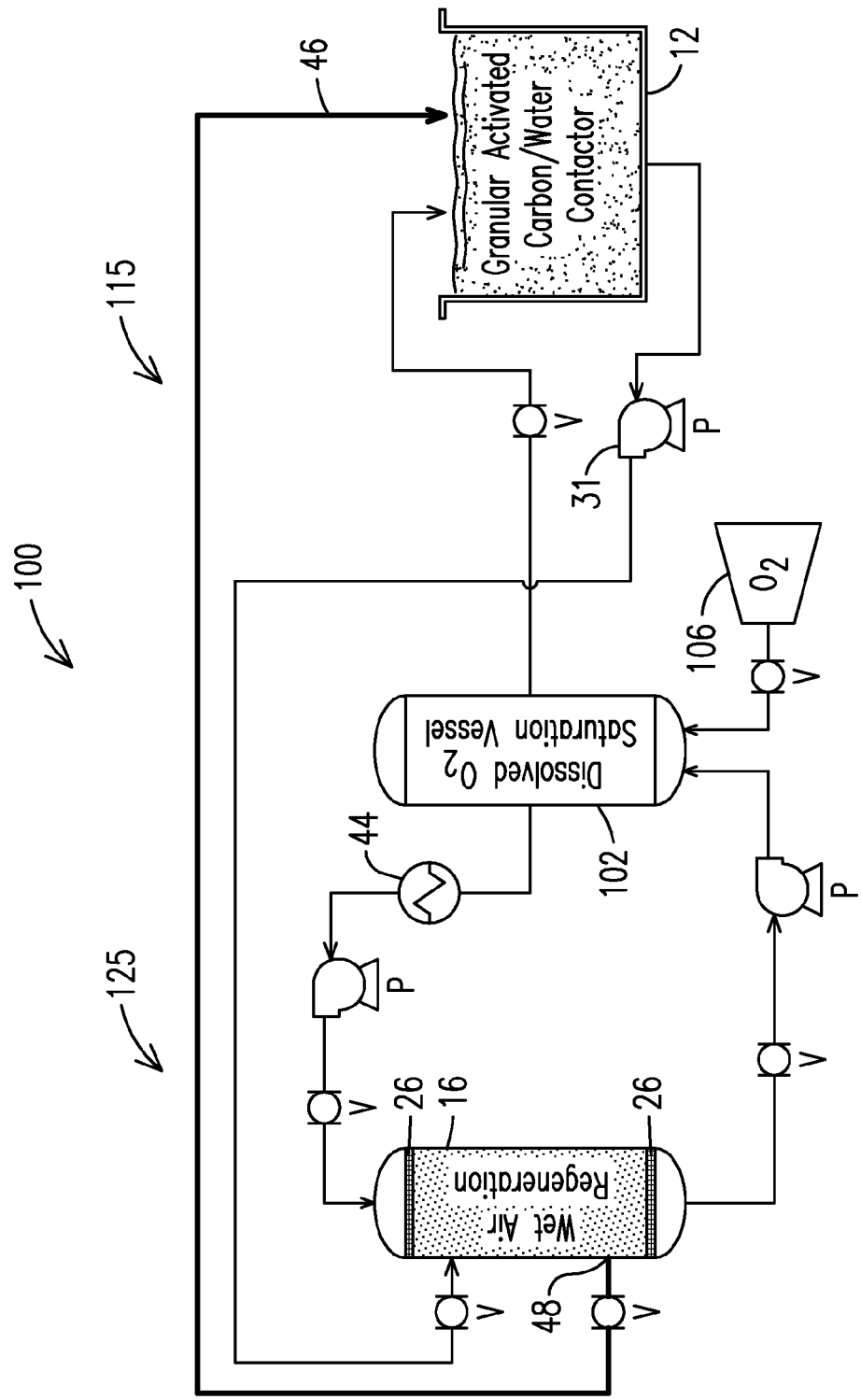

In certain embodiments, liquid may be bled from the dissolved $O_2$ saturation vessel 102 or from another location in the carbon reactivation circuit 125 to the GAC/water contactor 12. This bleed flow 108 functions to purge dissolved carbon dioxide and organic materials that enter the reactivation circuit 125 as organic material is removed from the GAC during the regeneration process. A make-up water supply (not shown) may be used to maintain water volume in the reactivation circuit 125. The addition of oxygen to the GAC/water contactor 12 aids in regenerating at least a portion of the GAC in the GAC/water contactor itself by providing extra available oxygen for the oxidation of organic compounds adsorbed onto a surface of the spent GAC 20 in the GAC/water contactor. Once the spent GAC 20 has been regenerated in the WAR unit 16, the regenerated GAC 46 may be directed back to the GAC/water contactor 12 on a continuous or intermittent basis from outlet 48 of the WAR unit 16 as shown in FIG. 3C. It is appreciated that one or more valves (V) coolers, heaters, sensors or pumps (P) may be included in any of the illustrated and/or described flow paths shown in any of the figures to facilitate the timing, properties, and extent of the flow of the particular components.

Similar to the embodiment shown in FIGS. 2A-2C, the introduction of spent GAC 20 into the WAR unit 16 is done on a batch or semi-batch basis, and thus the regeneration of the spent GAC 20 can also be said to be done on a batch or semi-batch basis. On the other hand, the oxygenated liquid 104 my delivered into the WAR unit 16 on a continuous basis. Because the spent GAC 20 is delivered to the WAR unit 16 on a batch or semi-batch basis, the spent GAC 20, which is typically in the form of a slurry, is not required to flow through a pressure control valve. This substantially decreases the likelihood of the pressure-induced reduction of the GAC to a smaller particle sized material, such as a powder.

Figure 4A:
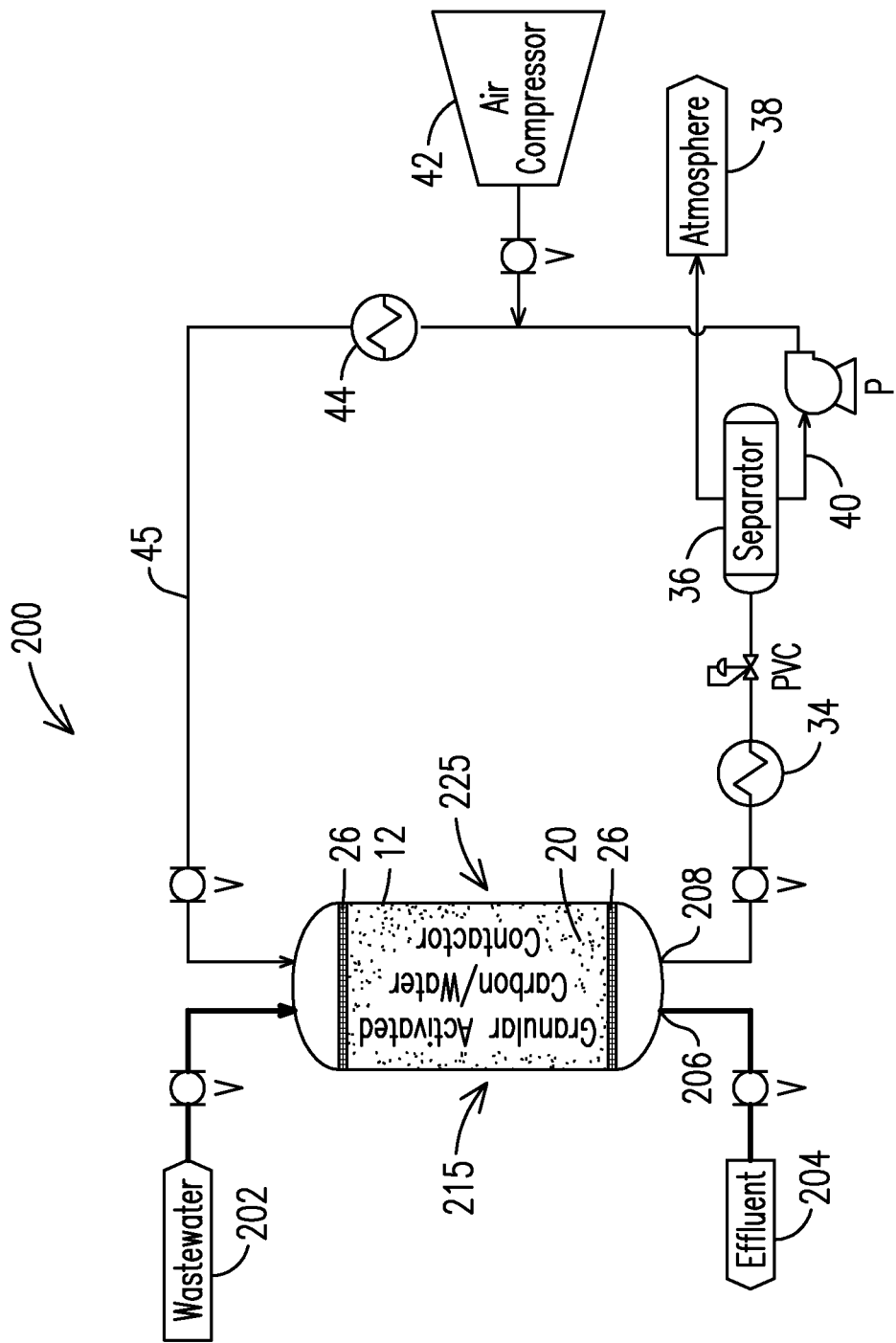
FIGS. 4A-4B are schematic representations of another embodiment of a system for regenerating GAC in accordance with an aspect of the present invention.
Figure 4B:
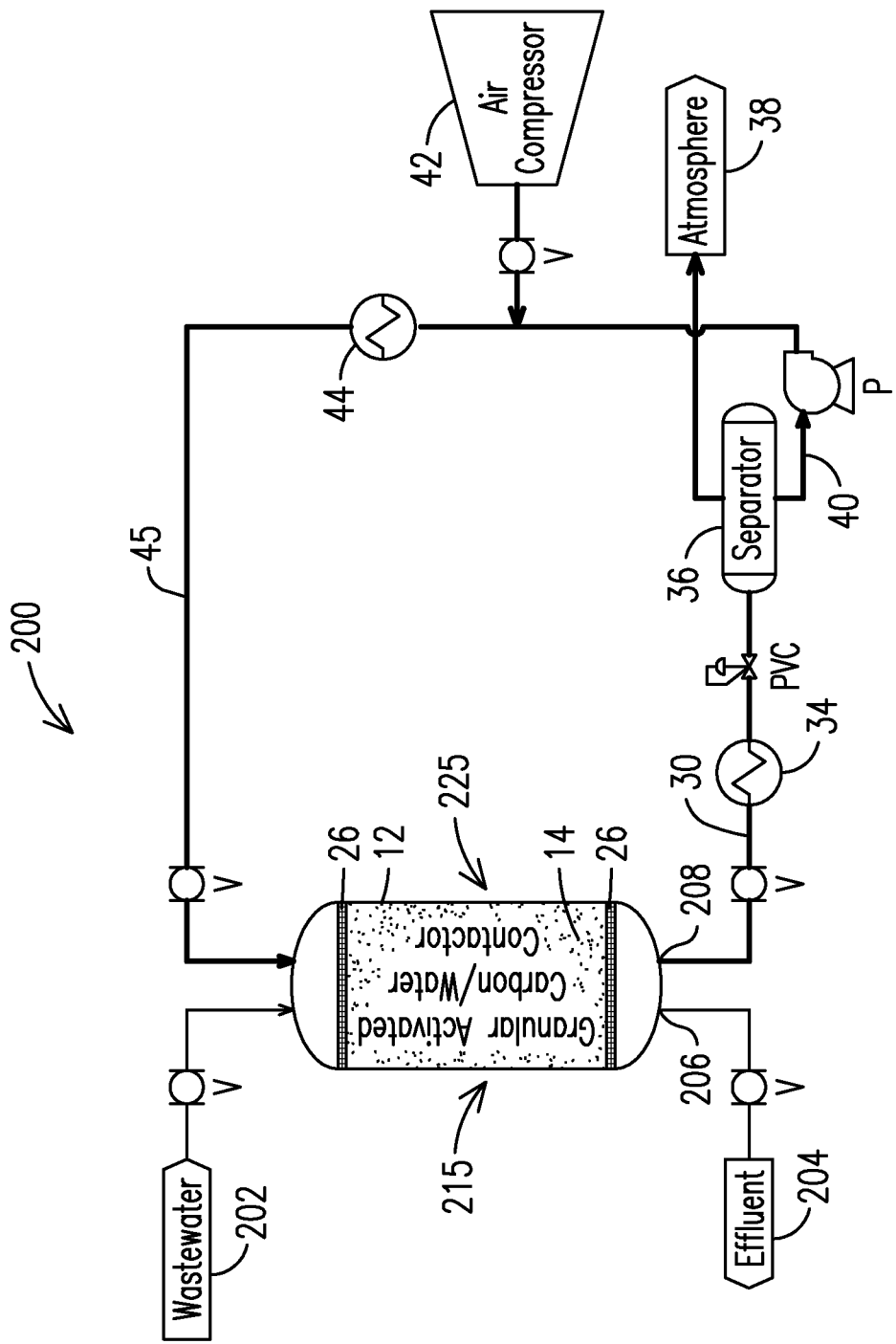

Referring now to FIGS. 4A-4B, there is shown an embodiment of the present invention wherein GAC may advantageously be regenerated in situ within the same vessel (e.g., a GAC column) within which an organic compound-containing stream is treated, thereby further simplifying the system. As shown in FIG. 4A, the system 200 comprises an integrated water circuit 215 and carbon reactivation circuit 225. The water circuit 215 includes a GAC/water contactor 12 comprising an amount of GAC as previously described herein for removing one or more contaminants from an organic compound-containing stream, such as wastewater stream 202. An effluent 204 is discharged from an outlet 206 of the GAC/water contactor 12 as shown in FIG. 4A to a suitable storage or reuse location. After one or more treatments of a wastewater stream, at least a portion of the GAC will become spent.

As shown in FIG. 4B, within the same vessel (GAC/water contactor 12), the spent GAC 20 can advantageously be regenerated. To accomplish this, the regeneration may be accomplished by any of the regeneration processes previously described herein. For example, as shown in FIG. 4B, to regenerate the spent GAC 20, the liquid portion 30 may travel through from an outlet 208 of the GAC/water contactor 12 to a cooler 34 to reduce a temperature of the liquid portion 30 before being directed through a separator 36. In the illustrated embodiment, the separator 36 is in fluid communication with a vent 38. The liquid 40 is oxygenated with gas from a suitable oxygen source, such as an air compressor 42. The oxygenated liquid 40 may further be heated by a heater 44 before being delivered to the GAC/water contactor 12. Following exposure of the spent GAC particles 20 to the oxygenated liquid 40 under elevated pressure and temperature, regenerated GAC 14 is provided. Utilizing the regenerated GAC in the GAC/water contactor 12, one or more additional wastewater streams 202 may be treated to remove contaminants there from, as shown in FIG. 4A. The dissolved carbon dioxide and organic materials that enter the regeneration circuit 225 as organic material are removed from the GAC during the regeneration process can be further treated in the process water circuit 215 upon completion of the regeneration process. Because the contactor 12 forms part of both the process water circuit 215 and the regeneration circuit 225, return line 45 functions as a fluid path for circulating the water containing dissolved organics to the water circuit 215 for further treatment in the manner of line 108 of FIG. 3A.

EXAMPLE

To test the effectiveness of using wet air regeneration (WAR) on the regeneration of GAC in such a system, carbon was put in-line at a refinery where a biologically-treated effluent was flowed through it. The GAC was allowed to become spent by adsorbing organic compounds. The GAC was tested by molasses removal efficiency (MRE) and iodine number tests. Samples of the carbon was then slurried with water and oxidized at 220° C., 230° C., and 240° C. for 15 minutes in batch shaking autoclaves. The oxidized carbon was then tested for MRE and iodine number for comparison. In addition, carbon attrition was measured by filtering the sample at the completion of the oxidations, drying and weighing them, and comparing them to the weight of carbon added. The results from this testing are summarized in Table 1.

TABLE 1

Bench Scale Autoclave Results from the WAR on GAC

| | MRE | Iodine Number | % Attrition |
|---|---|---|---|
| Virgin Carbon | 69% | 1276 | — |
| Spent Carbon | 38% | 530 | — |
| 220° C. - 15 min. | — | 687 | 3.0 |
| 230° C. - 15 min. | — | 682 | 8.9 |
| 240° C. - 15 min. | 79% | 722 | 5.6 |

The above results show that the MRE of the GAC after WAR was improved even over the virgin carbon. The results also showed that the Iodine Number of the GAC improved after WAR. The attrition testing showed some scatter, but all results were less than 10% attrition.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A water treatment system comprising:
a water circuit comprising a source of organic contaminants and a granular activated carbon (GAC)/water contactor for capturing the organic contaminants; and
a carbon regeneration circuit in fluid communication with the GAC/water contactor for regenerating spent GAC produced in the GAC/water contactor under wet air regeneration conditions effective to produce regenerated GAC and water comprising dissolved organics, wherein the water is in a liquid state; and
a fluid path for circulating the liquid water comprising dissolved organics to the water circuit for further treatment,
wherein the fluid path is a fluid path that does not circulate the regenerated GAC back to the water circuit.

2. The system of claim 1, wherein the carbon regeneration circuit comprises a pump, a heater, and a source of pressurized oxygen-containing gas interconnected with one another to circulate heated oxygenated water through the GAC/water contactor under conditions effective for wet air regeneration of spent GAC within the GAC/water contactor.

3. The system of claim 2, wherein the source of pressurized oxygen-containing gas comprises a dissolved oxygen saturation vessel, and wherein the carbon regeneration circuit circulates liquid only.

4. The system of claim 2, wherein the source of pressurized oxygen-containing gas comprises an air compressor, with the air compressor and heater being disposed upstream of the GAC/water contactor, and further comprising:
a cooler and a liquid/gas separator vented to the atmosphere disposed downstream of the GAC/water contactor.

5. The system of claim 1, wherein the GAC/water contactor comprises an aeration tank, and wherein the carbon regeneration circuit further comprises:
a regeneration vessel in fluid communication with the GAC/water contactor for receiving spent GAC from the aeration tank and for returning regenerated GAC to the aeration tank;
a pump, a heater and a source of oxygen-containing gas interconnected with one another to circulate heated oxygenated water through the regeneration vessel under conditions effective for wet air regeneration of the spent GAC within the regeneration vessel.

6. The system of claim 5, wherein the source of pressurized oxygen-containing gas comprises a dissolved oxygen saturation vessel, and wherein the carbon regeneration circuit circulates liquid only.

7. The system of claim 5, further comprising a GAC transfer pump in fluid communication between the GAC/water contactor and the regeneration vessel, the GAC transfer pump selected from the group consisting of an air lift pump, a low shear centrifugal pump, and a diaphragm pump.

8. The system of claim 5, wherein the regeneration vessel, pump, heater and source of oxygen-containing gas are skid or trailer mounted.

9. The system of claim 5, wherein the source of pressurized oxygen-containing gas comprises an air compressor, with the air compressor and heater being disposed upstream of the GAC/water contactor, and further comprising:
a cooler and a liquid/gas separator vented to the atmosphere disposed downstream of the GAC/water contactor.

10. The system of claim 6, wherein the fluid path for circulating the water comprising dissolved organics to the water circuit for further treatment comprises a bleed line interconnecting the regeneration circuit at a location at or downstream of the saturation vessel with the contactor.

11. A water treatment system comprising:
a water circuit comprising a source of organic contaminants and an activated carbon/water contactor for capturing the organic contaminants; and
a carbon regeneration circuit in fluid communication with the activated carbon/water contactor for regenerating spent activated carbon produced in the activated carbon/water contactor, the carbon regeneration circuit comprising a liquid water oxygenator, a regeneration vessel housing the spent activated carbon, and a carbon reactivation circuit configured to deliver oxygenated liquid water from the liquid water oxygenator to the regeneration vessel, to pass the oxygenated liquid water through the spent activated carbon to regenerate the spent activated carbon and deoxygenate the liquid water, and to deliver the deoxygenated liquid water back to the liquid water oxygenator,
wherein the spent activated carbon remains in the regeneration vessel during regeneration.

12. The system of claim 11, wherein the carbon regeneration circuit is operative to supply water in a liquid state and containing dissolved oxygen at a saturation level to the activated carbon/water contactor, and wherein the regeneration vessel comprises the activated carbon/water contactor.

13. A process for wastewater treatment comprising:
interconnecting a granular activated carbon (GAC)/water contactor of a process water circuit with a carbon regeneration circuit;
capturing organic contaminants from the process water circuit on GAC in the GAC/water contactor;
periodically regenerating spent GAC produced in the GAC/water contactor utilizing the carbon regeneration circuit by: holding the spent GAC in a regeneration vessel during regeneration; and passing an oxygenated liquid water through the regeneration vessel to regenerate the spent GAC and thereby form an organic-laden fluid in a liquid state; and
processing the organic-laden liquid fluid produced during the regenerating step in the process water circuit.

14. The process of claim 13, further comprising performing the regenerating step with the spent GAC in the GAC/water contactor.

15. The process of claim 13, further comprising delivering the spent GAC from the GAC/water contactor to a discrete regeneration vessel of the carbon regeneration circuit for the regenerating step.

16. The process of claim 15, further comprising:
delivering the spent GAC to the regeneration vessel at a delivery pressure that is lower than an elevated pressured to which the spent GAC is exposed during the regeneration step;
pressurizing the spent GAC in the regeneration vessel from the delivery pressure to the elevated pressure;
regenerating the spent GAC in the regeneration vessel at an elevated temperature and the elevated pressure with water containing oxygen at saturation; and
at least partially depressurizing the regeneration vessel for delivery of the spent GAC into the regeneration vessel and for return of regenerated GAC to the GAC/water contactor.

17. The process of claim 13, further comprising providing the carbon regeneration circuit as a skid or trailer mounted system for interconnection with an existing process water circuit.

18. The process of claim 13, wherein the carbon regeneration circuit comprises a carbon reactivation circuit comprising the regeneration vessel, a pump, a heater, an air compressor, a cooler and a gas/liquid separator, the carbon reactivation circuit configured to deliver heated air and water containing oxygen at a saturation level from the air compressor to the regeneration vessel, to pass the heated air and water containing oxygen through the spent GAC to regenerate the spent GAC and thereby form the organic-laden liquid fluid, and to deliver the organic-laden liquid fluid back to the air compressor, the process further comprising:
exposing the spent GAC to the heated air and water containing oxygen at the saturation level circulated through the carbon regenerating circuit under conditions effective for wet air regeneration.

19. The process of claim 13, wherein the carbon regeneration circuit comprises a carbon reactivation circuit comprising the regeneration vessel, a pump, a heater, a dissolved oxygen saturation vessel, and a cooler, the carbon reactivation circuit configured to deliver heated liquid water only from the dissolved oxygen saturation vessel to the regeneration vessel, to pass the heated liquid water only through the spent GAC to regenerate the spent GAC and thereby form the organic-laden liquid fluid, and to deliver the organic-laden liquid fluid back to the dissolved oxygen saturation vessel, the method further comprising:
exposing the spent GAC to the heated liquid water only circulated through the carbon regenerating circuit under conditions effective for wet air regeneration.

20. The process of claim 13, wherein the carbon regeneration circuit comprises:
the regeneration vessel;
a carbon transfer circuit connected between the GAC/water contactor and the regeneration vessel and operable to selectively transfer GAC there between; and
wherein the process further comprises circulating heated oxygenated water through the regeneration vessel under conditions effective for wet air regeneration of the spent GAC only after the spent GAC is resident within the regeneration vessel.

* * * * *